United States Patent [19]
Zablocki et al.

[11] Patent Number: 5,633,031
[45] Date of Patent: May 27, 1997

[54] COMPOSITION AND METHOD FOR BEVERAGES USING POSITIVELY CHARGED CARAMEL

[75] Inventors: Linda J. Zablocki, Mt. Prospect; Allison D. Vevang, Glenview, both of Ill.

[73] Assignee: The NutraSweet Company, Deerfield, Ill.

[21] Appl. No.: 525,327

[22] Filed: Sep. 8, 1995

[51] Int. Cl.$^6$ .................................................. A23L 1/27
[52] U.S. Cl. .................. 426/590; 426/269; 426/548; 426/655
[58] Field of Search .................. 426/590, 655, 426/548, 269

[56] References Cited

U.S. PATENT DOCUMENTS

| | | | |
|---|---|---|---|
| 4,551,342 | 11/1985 | Nakel et al. | 426/548 |
| 4,612,202 | 9/1986 | Engel et al. | 426/548 |
| 5,085,876 | 2/1992 | Tsau | 426/548 |

*Primary Examiner*—Helen Pratt
*Attorney, Agent, or Firm*—Jeffrey M. Hoster

[57] ABSTRACT

Improved carbonated soft drinks and other beverages sweetened with aspartame and colored by caramel color are disclosed. The beverages contain positively charged caramel color as a substitute for 5–70% of the conventional caramel color used in these beverages, which is negatively charged. The resulting products have improved taste characteristics.

11 Claims, No Drawings

COMPOSITION AND METHOD FOR BEVERAGES USING POSITIVELY CHARGED CARAMEL

BACKGROUND OF THE INVENTION

This invention relates to the field of beverages such as carbonated soft drinks, ready-to-drink beverages and powdered soft drinks. More specifically, it relates to a method for improving the taste profile of these beverages when sweetened with aspartame.

Historically, the key determining factor for proper selection of caramel color is the net ionic charge of the caramel color at the pH of the product. Beverages such as carbonated cola soft drinks typically contain caramel color manufactured using sulfite and ammonia as reactants. In the cola soft drinks, these caramel colors carry a net negative ionic charge. These caramel colors are commonly known as beverage caramels. In applications where the caramel color will come into contact with proteins as in beer and meat products, a positively-charged caramel color is required. The article "Characterization and Specifications of Caramel Colours: An Overview", D. V. Myers and J. C. Howell, Food Chem. Toxic., Vol. 30, No. 5, pp. 359–363 (1992) details the types of caramels conventionally used with foods.

Aspartame is a high potency sweetening ingredient used in the vast majority of sugar-free soft drinks sold in the United States, as well as many other ready-to-drink beverages and powdered soft drinks. The use of aspartame would be even greater, with new markets opening worldwide, and in blends with sucrose and high fructose corn syrup ("HFCS") but for some limitations. While aspartame clearly tastes more like sugar than other high potency sweeteners currently marketed, some consumers perceive a taste difference from sucrose-sweetened beverages. It is felt by some that this limits the acceptance of beverages containing aspartame for marketing to consumers who desire the taste they recognize from sugar or HFCS sweetened beverages.

As both caramel color and aspartame are used in virtually all sugar-free cola-type soft drinks sold in the United States, there have been many attempts to improve the functionality of both caramel color and aspartame for sugar-free soft drinks. For example, double strength caramel (which is negatively charged) was developed to provide necessary color concentration with very minimal calorie contribution. Other efforts have focused on combining the components prior to addition to the soft drink. Claimed benefits have been improved dissolution rate in the soft drink. For examples of such improvements, see Great Britain Patent No. 2104369B and U.S. Pat. No. 5,085,876. In these patents, no caramels are excluded from potential use, but the preferred caramels are clearly negatively charged caramel.

A product which allows more flexible use of aspartame while improving the taste profile of the beverage is desirable. Further, such a product which does not add any ingredients unfamiliar to consumers or bottlers is of special interest. This invention provides such an improved product.

SUMMARY OF THE INVENTION

This invention details the production of beverages in which positively charged caramel is used as a replacement for the a portion of the negatively charged caramel conventionally found in beverages. It has been unexpectedly discovered that beverages containing a positively charged caramel as 1:1 replacement for about 5 to 70% of the negatively charged caramel conventionally used in these beverages have sensory characteristics equivalent or better than conventional beverages. These beverages have been found to more closely match the flavor profile of sucrose-sweetened beverages.

DETAILED DESCRIPTION OF THE PREFERRED EMBODIMENT

In a preferred embodiment, a conventional beverage formulation is changed by replacing a percentage of the soft drink caramel color conventionally used in the formulation by positively charged caramel color.

To gain the inventive benefits, from about 5 to 70%, and more preferably, 5 to 50%, of the caramel typically found in the beverage is replaced on a 1:1 basis by positively charged caramel. The amount of positively charged caramel used is dependent on the specific beverage, with especially preferred ranges being 15 to 25% replacement in carbonated cola soft drinks and 7 to 15% replacement in powdered soft drinks. Liquid caramels and dry caramels may be used, with liquid caramels being preferred for carbonated soft drinks and ready-to-drink beverages and dry caramels preferred for powdered soft drinks. The total amount by weight of positively charged caramel used is about 50 to 1000 parts per million (ppm), with the amount by weight of negatively charged caramel being about 500 to about 2000 ppm. A preferred amount in carbonated soft drinks is about 100 to 700 ppm, with a preferred amount for cola beverages being about 100 to 500 ppm. In powdered soft drinks, where the use of dry caramel is recommended, a preferred amount is 50 to 500 ppm, more preferably 50 to 200 ppm. In powdered soft drinks, where the use of dry caramel is recommended, a preferred amount is 50 to 200 ppm.

Multiple person sensory panels have shown significant improvement in the acceptability of aspartame sweetened cola beverages containing positively charged caramel when compared with a cola beverage identically formulated except for the caramel, which was entirely negatively charged beverage caramel.

Particularly preferred positively charged caramels for carbonated soft drinks include P212 and P170, each manufactured by Sethness Products Company. Colas manufactured with these caramels as additives surprisingly have been found to have improved overall cola flavor, overall mouthfeel and overall liking compared to identical colas including negatively charged caramel. For use with powdered soft drinks, a particularly preferred positively charged caramel is P389, manufactured by Sethness Products company.

The following examples detail the application of caramel to beverages, and sensory results of such use in beverages. The examples are not intended to limit the scope of the invention.

EXAMPLE 1-COLA BEVERAGE WITH SENSORY RESULTS

Two aspartame sweetened (0.0525% aspartame) cola beverages where prepared using identical formulations, except for the caramel color used. Sample 1 contained 1400 ppm of two fold beverage caramel, which is a negatively charged caramel recommended for use in colas. Sample 2 contained 1190 ppm of two fold beverage caramel and 210 ppm P170 caramel, with the P170 acting as a replacement for 15% of the two fold beverage caramel used in Sample 1. Sample 3 contained 1050 ppm of two fold beverage caramel and 350 ppm of P212 caramel, with the P212 caramel acting as a replacement for 25% of the two fold beverage caramel used in Sample 1.

Sensory Panels

Using approximately 50 untrained panelists, each of the above colas was compared in a blind taste test for overall liking, overall sweetness, overall cola flavor, overall mouthfeel, and bitterness. Samples 2 and 3 were each found to have increased overall liking, overall mouthfeel and stronger cola flavor relative to Sample 1.

We claim:

1. A beverage selected from the group consisting of carbonated soft drinks, powdered soft drinks and ready-to-drink beverages wherein said beverage comprises aspartame as a sweetening agent and a positively charged caramel in an amount of from about 50 to about 1000 ppm by weight of the total weight of said beverage.

2. The beverage of claim 1 wherein said beverage further comprises negatively charged caramel in an amount of from about 500 to about 2000 ppm by weight of the total weight of said beverage.

3. The beverage of claim 1 consisting of carbonated soft drinks comprising about 100 to 700 ppm positively charged caramel.

4. The beverage of claim 1 consisting of cola carbonated soft drinks comprising about 100 to 500 ppm positively charged caramel.

5. The beverage of claim 1 consisting of powdered soft drinks comprising about 50 to 500 ppm positively charged caramel.

6. In a method of producing a beverage selected from the group consisting of carbonated soft drinks, ready-to-drink beverages and powdered soft drinks comprising negatively charged caramel color and aspartame, the improvement which comprises:

replacing about 5 to 70% by weight of said negatively charged caramel color with positively charged caramel color.

7. The method of claim 6 wherein said beverage is a carbonated soft drink.

8. The method of claim 7 wherein 15 to 25% by weight of said negatively charged caramel is replaced by positively charged caramel.

9. The method of claim 6 wherein said beverage is a powdered soft drink.

10. The method of claim 9 wherein 5 to 50% by weight of said negatively charged caramel is replaced by positively charged caramel.

11. A method for producing an improved taste in cola beverages containing aspartame as a sweetening agent, comprising the step of:

adding to said beverage positively charged caramel in an amount of from about 0.005 to 0.1% by weight of the weight of said beverage.

* * * * *